(12) United States Patent
Sakuma et al.

(10) Patent No.: US 11,417,892 B2
(45) Date of Patent: Aug. 16, 2022

(54) FUEL CELL

(71) Applicant: Hitachi High-Tech Corporation, Tokyo (JP)

(72) Inventors: Noriyuki Sakuma, Tokyo (JP); Yoshitaka Sasago, Tokyo (JP); Aritoshi Sugimoto, Tokyo (JP); Nobuyuki Mise, Tokyo (JP); Seiichi Watanabe, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 17/279,440

(22) PCT Filed: Oct. 12, 2018

(86) PCT No.: PCT/JP2018/038029
§ 371 (c)(1),
(2) Date: Mar. 24, 2021

(87) PCT Pub. No.: WO2020/075285
PCT Pub. Date: Apr. 16, 2020

(65) Prior Publication Data
US 2021/0408556 A1    Dec. 30, 2021

(51) Int. Cl.
*H01M 4/92* (2006.01)
*H01M 4/86* (2006.01)
*H01M 8/10* (2016.01)

(52) U.S. Cl.
CPC ......... *H01M 4/925* (2013.01); *H01M 4/8657* (2013.01); *H01M 8/10* (2013.01); *H01M 2300/0065* (2013.01)

(58) Field of Classification Search
CPC ...... H01M 4/925; H01M 4/8657; H01M 8/10; H01M 2300/0065; H01M 4/8871;
(Continued)

(56) References Cited

U.S. PATENT DOCUMENTS

| 2003/0012994 A1 | 1/2003 | Kushibiki et al. |
| 2003/0104268 A1 | 6/2003 | Shibata et al. |
| 2009/0029195 A1 | 1/2009 | Gauckler et al. |

FOREIGN PATENT DOCUMENTS

| CN | 1489799 A | 4/2004 |
| CN | 101326669 A | 12/2008 |

(Continued)

OTHER PUBLICATIONS

International Search Report (PCT/ISA/210) issued in PCT Application No. PCT/JP2018/038029 dated Nov. 20, 2018 with English translation (five (5) pages).

(Continued)

*Primary Examiner* — Helen Oi K Conley
(74) *Attorney, Agent, or Firm* — Crowell & Moring LLP (57) ABSTRACT

Provided is a highly reliable fuel cell that improves power generation efficiency of the fuel cell and that is less likely to cause damage to an electrode and an electrolyte film. The fuel cell includes a support substrate (2, 3) having a region in which a support portion having a mesh-like shape in a plan view is provided, a first electrode 4 on the support substrate, an electrolyte film 5 on the first electrode, and a second electrode 6 on the electrolyte film. The first electrode includes a first thin film electrode 4A formed in a manner of covering at least the region, and a first mesh-like electrode 4B connected to the first thin film electrode and provided corresponding to the support portion. The first mesh-like electrode 4B has a film thickness larger than that of the first thin film electrode and has a mesh-like shape in a plan view.

15 Claims, 6 Drawing Sheets

(58) Field of Classification Search
CPC ....... H01M 4/8626; H01M 2008/1293; H01M 4/09; Y02E 60/50
See application file for complete search history.

(56) References Cited

FOREIGN PATENT DOCUMENTS

| | | |
|---|---|---|
| JP | 2002-222659 A | 8/2002 |
| JP | 2003-168448 A | 6/2003 |
| JP | 2003-346817 A | 12/2003 |
| JP | 2009-512166 A | 3/2009 |
| TW | 201616714 A | 5/2016 |
| WO | WO 2009/096399 A1 | 8/2009 |

OTHER PUBLICATIONS

Japanese-language Written Opinion (PCT/ISA/237) issued in PCT Application No. PCT/JP2018/038029 dated Nov. 20, 2018 (three (3) pages).
Taiwanese-language Office Action issued in Taiwanese Application No. 108136337 dated Jun. 3, 2020 with partial English translation (four (4) pages).

FUEL CELL

TECHNICAL FIELD

The present invention relates to a fuel cell.

BACKGROUND ART

In recent years, a fuel cell has attracted attention as a clean energy source that is capable of high energy conversion and discharging no contaminants such as carbon dioxide gas and nitrogen oxides. Among fuel cells, solid electrolyte type fuel cells (hereinafter, abbreviated as solid oxide fuel cell (SOFC)) have high power generation efficiency and are capable of using gases such as hydrogen, methane, and carbon monoxide which are easy to handle as fuel and thus have many advantages over other methods, and a cogeneration system excellent in energy saving and environmental characteristics is expected. The SOFC has a structure in which a solid electrolyte is sandwiched between a fuel electrode and an air electrode, a fuel gas such as hydrogen is supplied to a fuel electrode side using the electrolyte as a partition wall, and air or oxygen gas is supplied. There are multiple types of SOFCs and PTL 1 discloses a silicon type SOFC that is capable of low temperature operation (700° C. or lower), in which a low conductivity of an electrolyte is compensated by thinning the electrolyte, a through window is formed in a single crystal silicon substrate, and a fuel electrode, an electrolyte, and an air electrode are stacked in the through window.

In the silicon type SOFC disclosed in PTL 1, at least one of the fuel electrode and the air electrode in contact with the electrolyte of the through window is a current collecting electrode for collecting a current, and includes a frame electrode forming an opening portion through which a surface of the electrolyte is exposed, and a large number of fine granular electrodes formed on the surface of the electrolyte as reaction electrodes for decomposing gas in the opening portion of the frame electrode.

CITATION LIST

Patent Literature

PTL 1: JP-A-2003-346817

SUMMARY OF INVETION

Technical Problem

The granular electrodes are not coupled to each other, and even when power is generated by the granular electrodes, the surface of the electrolyte needs to be conducted to the frame electrode by a tunnel current, resulting in an increase in power loss and a decrease in power generation efficiency. When the granular electrodes and the frame electrode are provided under the electrolyte, unevenness is generated at the time of forming the electrolyte, and a step portion of the electrolyte is likely to be damaged due to the influence of thermal expansion caused by the temperature at the time of operation.

An object of the present invention is to provide a highly reliable fuel cell that improves power generation efficiency of a fuel cell and that is less likely to cause damage to an electrode and an electrolyte film.

Solution to Problem

Typical embodiments disclosed in the present application will be briefly described as follows.

The fuel cell includes a support substrate having a region in which a support portion having a mesh-like shape in a plan view is provided, a first electrode on the support substrate, an electrolyte film on the first electrode, and a second electrode on the electrolyte film. The first electrode includes a first thin film electrode formed in a manner of covering at least the region, and a first mesh-like electrode connected to the first thin film electrode and provided corresponding to the support portion. The first mesh-like electrode has a film thickness larger than that of the first thin film electrode and has a mesh-like shape in a plan view.

Advantageous Effect

Effects obtained by typical inventions disclosed in the present application will be briefly described as follows. By lowering a resistance value of an electrode, power loss can be prevented and power generation efficiency can be improved.

Other problems and novel characteristics will become apparent from a description of the description and the accompanying drawings.

DESCRIPTION OF EMBODIMENTS

Embodiments of the invention will be described below with reference to the drawings. Fuel cells of the embodiments are fuel cells having a stacked structure in which an electrolyte is sandwiched between electrodes using a silicon substrate on which a diaphragm is formed.

First Embodiment

Figure 1:
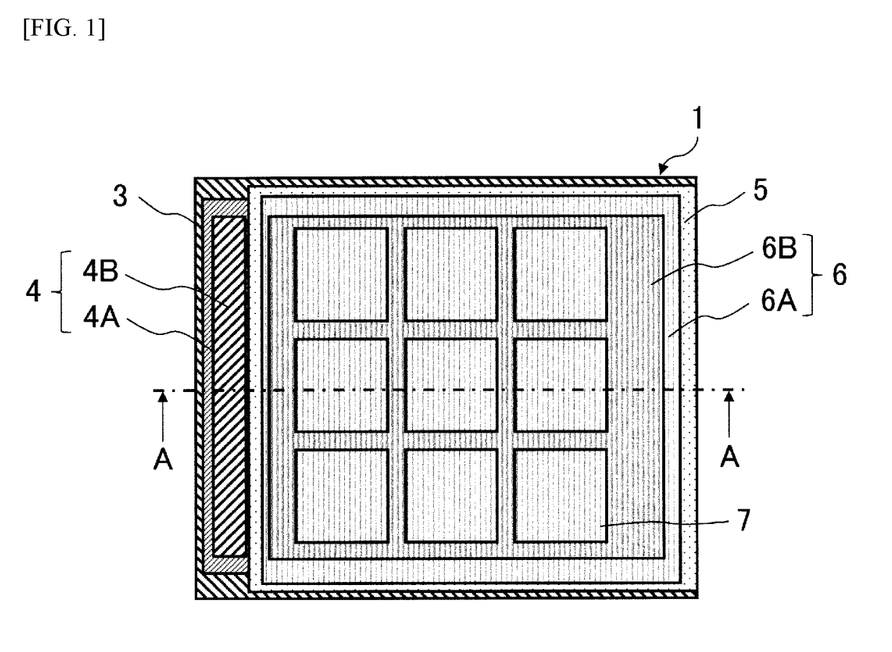
FIG. 1 is a plan view of a fuel cell according to a first embodiment.
Figure 2:
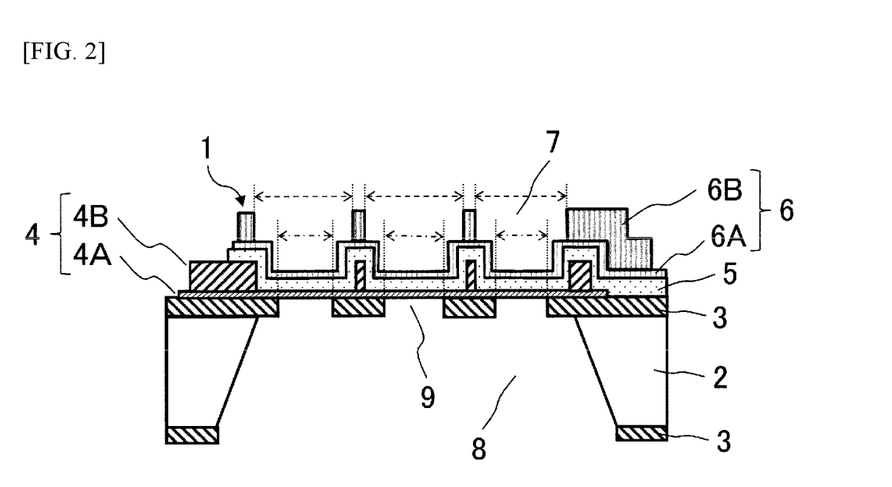
FIG. 2 is a cross-sectional view of the fuel cell taken along a line A-A in FIG. 1.

FIG. 1 is a plan view of a fuel cell according to a first embodiment. FIG. 2 is a cross-sectional view taken along a line A-A in FIG. 1. As shown in FIG. 1, in a fuel cell 1, a part of a first electrode 4 including a first thin film electrode 4A and a first mesh-like electrode 4B is exposed on an insulating film 3 formed on a semi-conductor substrate 2 containing single crystal silicon (Si). A part of the insulating film 3 other than a part where the first electrode 4 is exposed is widely covered with an electrolyte film 5. Further, a second electrode 6 including a second thin film electrode 6A and a second mesh-like electrode 6B is formed inside the electrolyte film 5. As will be described later, film thicknesses of the first thin film electrode 4A and the second thin film electrode 6A are fairly small. The second mesh-like electrode 6B has a plurality of electrode opening portions 7 and the second thin-film electrode 6A is exposed from the electrode opening portions 7. The first electrode 4 and the second electrode 6 exposed on the insulating film 3 are output terminals, and are connected to the outside to supply power generated by the fuel cell 1.

As shown in FIG. 2, the semi-conductor substrate 2 has a shape in which a first opening portion 8 is obtained by removing an inner side of the semi-conductor substrate 2 and the insulating film 3 is exposed in the first opening portion 8. Since a stacked film of the electrode and the electrolyte film is supported by the semi-conductor substrate 2 and the insulating film 3, the semi-conductor substrate 2 and the insulating film 3 are collectively referred to as a support substrate. In the first opening portion 8, a plurality of second opening portions 9 are provided in the insulating film 3. Each of the second opening portions 9 has a rectangular shape in a plan view. In the first opening portion 8, the insulating film 3 has a mesh-like shape in the plan view and functions as a support portion that supports the electrode and the electrolyte film stacked on the support substrate. The first thin film electrode 4A is formed on the insulating film 3 in a manner of covering at least the first opening portion 8. Therefore, the first thin film electrode 4A is exposed to a first opening portion 8 side in the second opening portions 9. The first mesh-like electrode 4B is disposed via the first thin film electrode 4A in a manner of corresponding to a part of the insulating film 3 other than the second opening portions, that is, the support portion having a mesh-like shape, and thereby the first electrode is formed. In this figure, although the first mesh-like electrode 4B is shown in a separated manner, the first mesh-like electrode 4B has a mesh-like planar shape similar to that of the second mesh-like electrode 6B shown in FIG. 1, and is electrically connected in places that are not shown. Although not particularly limited, a length of one side of the first opening portion 8 is about 5 mm, and a length of one side of the second opening portion 9 is about 300 μm.

The electrolyte film 5 is formed on most part of the first electrode 4. The second thin film electrode 6A is formed on the electrolyte film 5 in a manner of covering at least the first opening portion 8 and the second opening portions 9. On the second thin film electrode 6A, the second mesh-like electrode 6B is formed corresponding to a region other than the second opening portions 9 and therefore corresponding to the support portion having the mesh-like shape. The second thin film electrode 6A and the second mesh-like electrode 6B are electrically connected to each other to form the second electrode 6.

Therefore, although the electrode opening portions 7 of the second electrode 6 are arranged corresponding to the second opening portions 9, as long as a strength of the first opening portion 8 is maintained, it is preferable that the second opening portion 9 is arranged inside the electrode opening 7, that is, an opening area of the electrode opening 7 is larger than an opening area of the second opening portion 9. By satisfying the relationship, the first mesh-like electrode 4B and the second mesh-like electrode 6B can be supported in the first opening portion 8 by the insulating film 3 which is the supporting portion.

A film thickness of the first mesh-like electrode 4B is larger than that of the first thin film electrode 4A, and similarly, a film thickness of the second mesh-like electrode 6B is larger than that of the second thin film electrode 6A. As a result, a resistance value of the first electrode 4 and a resistance value of the second electrode 6 can be reduced, and power loss (resistance loss) due to an electrode resistance when the fuel cell 1 generates power can be reduced.

Figure 3:
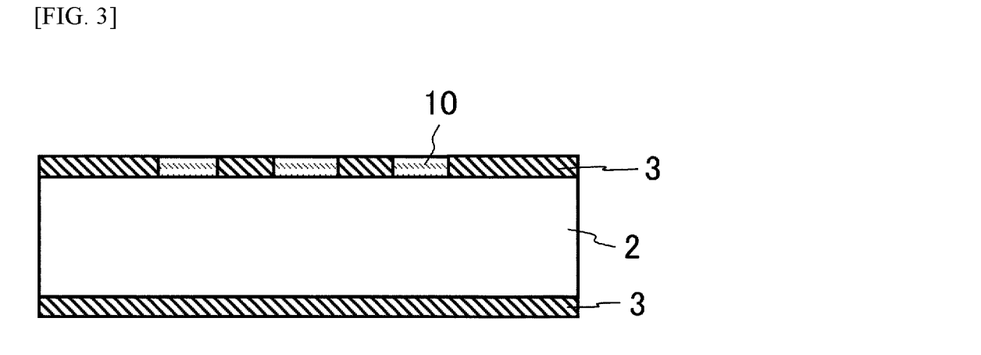
FIG. 3 is a cross-sectional view of a main part showing a manufacturing process of the fuel cell according to the first embodiment.
Figure 4:
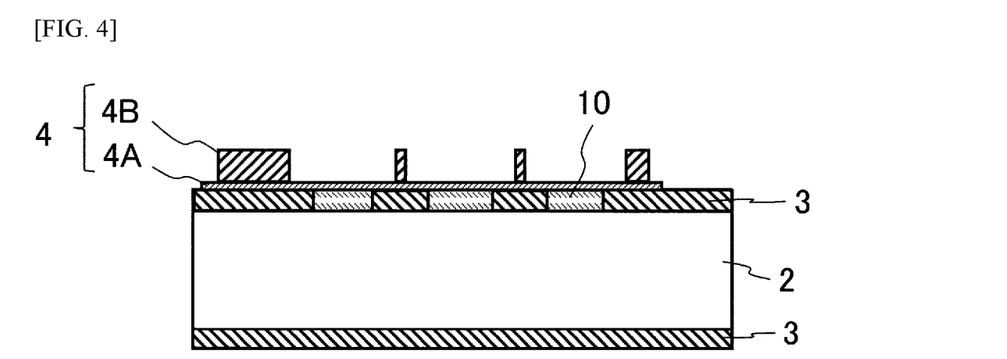
FIG. 4 is a cross-sectional view of the main part showing the manufacturing process of the fuel cell according to the first embodiment.
Figure 5:
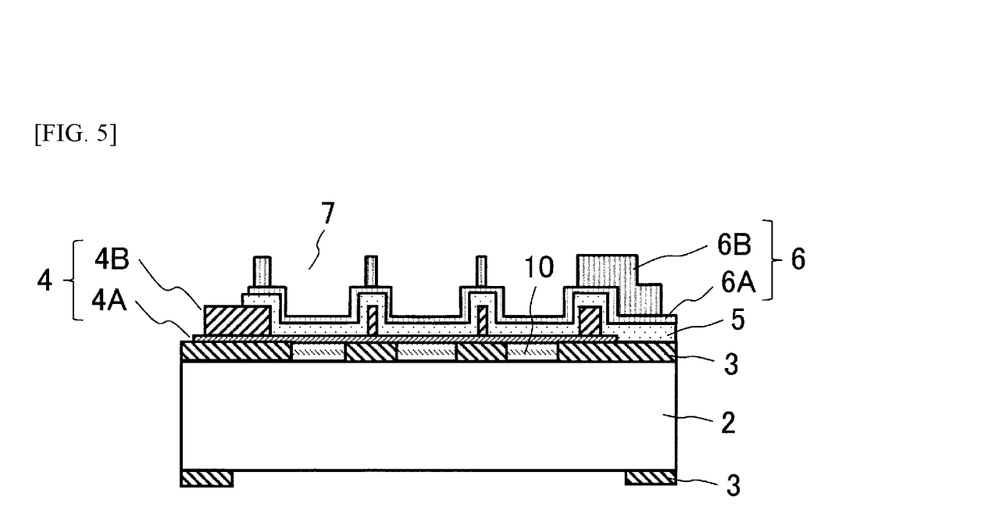
FIG. 5 is a cross-sectional view of the main part showing the manufacturing process of the fuel cell according to the first embodiment.

Next, a method for manufacturing the fuel cell 1 according to the first embodiment will be described in an order of steps with reference to FIGS. 3 to 5. FIGS. 3 to 5 are sectional views of a main part taken along the line A-A of FIG. 1 in the manufacturing process of the fuel cell 1. First, as shown in FIG. 3, the silicon substrate 2 containing single crystal Si and having a crystal orientation of Si <100> is prepared, and the insulating film 3 is formed. The silicon substrate 2 has a thickness of 400 μm or more. As the insulating film 3, for example, a silicon nitride film having a tensile stress and a thickness of about 200 nm is formed by a CVD method. In the case of the CVD method, a silicon nitride film having the same film thickness is also formed on a back side of the semi-conductor substrate. Next, patterning is performed on the insulating film 3 on a front side by using a photolithography technique, and a part of the insulating film 3 is removed. The region removed is a region corresponding to the second opening portions 9 of the fuel cell 1. Next, as an insulating film 10, a silicon oxide film is formed to be thicker than the insulating film 3 by using, for example, the CVD method. Thereafter, planarization is performed by chemical mechanical polishing (CMP) until the insulating film 3 is exposed so that a step between the insulating film 3 and the insulating film 10 is eliminated.

Next, as shown in FIG. 4, a metal film, for example, a platinum film (Pt) having a thickness of 20 nm is formed by a sputtering method. Thereafter, patterning is performed using a photolithography method to reliably cover the insulating film 10, and the first thin film electrode 4A is formed by using a dry etching method using Ar (argon) gas or the like. At the time, in order to improve an adhesive force between the Pt film and the insulating film 3 as well as the insulating film 10, it is also desirable to etch surfaces of the insulating film 3 and the insulating film 10, which are underlayers, by about 10 to 15 nm, for example, by sputtering etching using Ar gas before the Pt film is formed, and modify the surfaces, or to form a titanium film (Ti) with a thickness of about 2 nm as a barrier metal film that assists adhesion. Next, a pattern of a negative resist having an opening in a region other than the insulating film 10 is formed by the photolithography technique. Next, for example, a Pt film having a thickness of about 300 nm is formed on the first thin film electrode 4A and the negative resist pattern by the sputtering method, and then the Pt film on the negative resist is removed by a lift off method of removing a negative resist, and thereby the first electrode 4 in which the first thin film electrode 4A and the first mesh-like electrode 4B are stacked is formed. In order to improve an adhesive force between the first thin film electrode 4A and the first mesh-like electrode 4B, sputtering etching may be performed before the Pt film is formed. At the time, since the first thin film electrode 4A exposed from the first mesh-like electrode 4B is fairly thin, the first thin film electrode 4A has small grains and good flatness.

Next, as shown in FIG. 5, a yttrium-containing zirconium oxide film (YSZ film) having a thickness of 500 nm or less, for example, is formed as the electrolyte film 5 on the first electrode 4 by using the sputtering method. In the present embodiment, since the first thin film electrode 4A has good flatness, crystallinity of the YSZ film is less likely to be impaired, and the first thin film electrode 4A can be formed to be as thin as, for example, about 100 nm. Next, for example, a Pt film having a thickness of about 20 nm is formed by sputtering, patterning is performed by using photolithography method, and the second thin film electrode 6A is formed by dry etching using Ar gas. Next, the second mesh-like electrode 6B is formed with a film thickness of about 300 nm by the lift off method using the negative resist described above. As a result, the electrode opening portions 7 are formed. After that, the electrolyte film 5 is patterned by using a lithography method, and the electrolyte film 5 at a position at which the first electrode 4 and the like is to be exposed is removed by dry etching using a fluorine-based gas or by wet etching. The electrolyte film 5 may be patterned before the second electrode 6 is formed by the lift-off method using the negative resist. Subsequently, a back surface of the silicon substrate 2 is exposed to the insulating film 3 on the back surface of the silicon substrate 2 by using the photolithography technique and the insulating film etching technique.

Subsequently, using the patterned insulating film 3 on the back surface of the silicon substrate 2 as a mask, a Si film of the silicon substrate 2 is removed by wet etching using a potassium hydroxide (KOH) solution and a tetramethylamide (TMAH) solution, or by dry etching using a fluorine-based gas as a main component, thereby forming the first opening portion 8. Since the Si film, the insulating film 3 and the insulating film 10 on the front side have a sufficient etching selection ratio, the Si film remains as an etching stopper even after the etching of the silicon substrate 2 is completed. Next, by fluorine-based wet etching, the insulating film 10 is removed, and the fuel cell 1 is formed.

Each of the first thin film electrode 4A and the second thin film electrode 6A may be a film formed by using the sputtering method or the like, having a large number of grain boundaries (the grain boundaries preferably communicate with a surface in contact with the electrolyte film 5 and a fuel ($H_2$) or air ($O_2$) supplied to the fuel cell 1, and have columnar crystals), and having a melting point higher than a use temperature (for example, 900° C. or higher). Examples of such a film include, in addition to a Pt film, a silver film (Ag), a nickel film (Ni), a chromium film (Cr), a palladium film (Pd), a ruthenium film (Ru), and a rhodium film (Rh).

The first mesh-like electrode 4B and the second mesh-like electrode 6B are preferably made of a metal having a low resistivity, and may be a gold film (Au), a silver film (Ag), a molybdenum film (Mo) which is a refractory metal, a tungsten film (W), a tantalum film (Ta), a hafnium film (Hf), a silicon film containing impurities, or the like. When used at a low temperature of 450° C. or lower, a gold film (Au), a silver film (Ag), an aluminum film (Al), a copper film (Cu), carbon (C), or the like may be used. Further, a stacked film of the exemplified conductive films may be used.

When a corrosive gas is contained in the fuel of the fuel cell 1, the first thin film electrode 4A and the second thin film electrode 6A may be conductive compound materials such as a titanium nitride film (TiN), a tungsten nitride film (WN), a molybdenum nitride film (MoN), a hafnium nitride film (HfN), and tantalum nitride (TaN).

The insulating film 3 is not limited to a single layer of the silicon nitride film, and may be another insulating film such as an aluminum nitride film, a stacked film of the silicon nitride film and the silicon oxide film, or a stacked film of the silicon nitride film, the silicon oxide film, and the aluminum nitride film. The fuel cell 1 is subjected to a thermal stress caused by a thermal cycle. In order to maintain a mechanical strength of the fuel cell, the insulating film 3 is caused to have tensile stress in the first opening portion 8.

The hydrogen gas permeability of the first electrode or the second electrode formed as described above will be described. In order to improve the power generation efficiency of the fuel cell using the electrolyte film as in the present embodiment, it is required to improve an ion conductivity of the electrolyte film and reduce the power loss. Although depending on a use environment such as the operating temperature, in order to improve the ion conductivity of the electrolyte film, it is required to reduce the film thickness of the second opening portion 9 in order to efficiently ionize and conduct the fuel gas. However, in order to reduce the film thickness of the second opening portion 9, such a trade-off relationship is necessary that, when the film thickness of both electrodes sandwiching the electrolyte film is reduced, the resistance value of the electrodes increases, and the power loss increases.

Figure 6A:
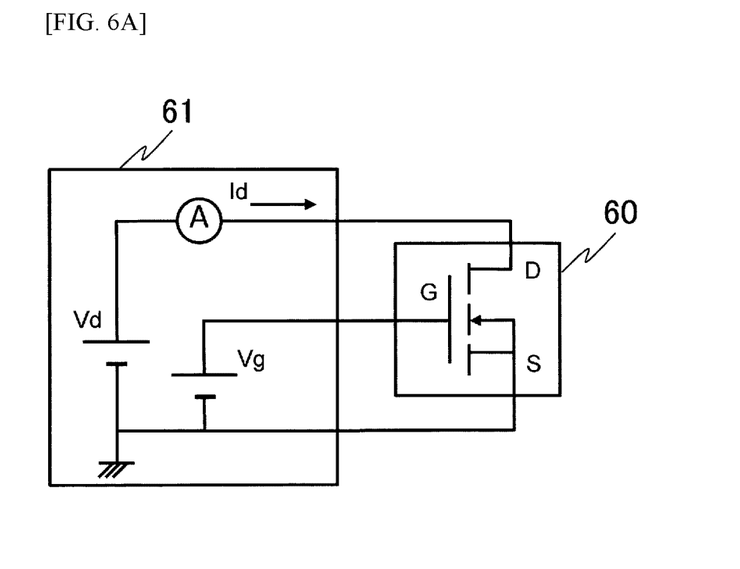
FIG. 6A is a circuit diagram of a measurement circuit for evaluating hydrogen gas permeability of a thin film electrode.

In order to evaluate the hydrogen gas permeability of the thin film electrode, a measurement circuit shown in FIG. 6A was used. An evaluation sample 60 has a MOSFET structure having a source (S), a drain (D), and a gate (G). A silicon oxide film having a thickness of, for example, 150 nm is formed as a gate insulating film, and a Pt film having a predetermined thickness is formed thereon as a gate electrode (G). In order to evaluate a relationship between the electrode film thickness and the hydrogen gas permeability to be described later, a plurality of evaluation samples 60 having different film thicknesses were prepared by setting a thinnest film thickness to 2 nm and a thickest film thickness to 50 nm. The measurement circuit 61 obtains an Id-Vg characteristic of the evaluation sample 60 by applying a constant voltage Vd (for example, 1.5 V) between the source and the drain of the evaluation sample 60 and measuring a drain current Id while sweeping a source-gate voltage Vg. The measurement is performed under two conditions of presence and absence of a hydrogen atmosphere. The Id-Vg characteristic in the hydrogen atmosphere is shifted in a direction of lowering a threshold voltage of the MOSFET as compared with the Id-Vg characteristic in an atmosphere not containing hydrogen. This is because hydrogen ions pass through the gate electrode, and thereby a current easily flows between the source and the drain. This is also supported by a fact that the drain current increases as a hydrogen concentration increases.

Figure 6B:
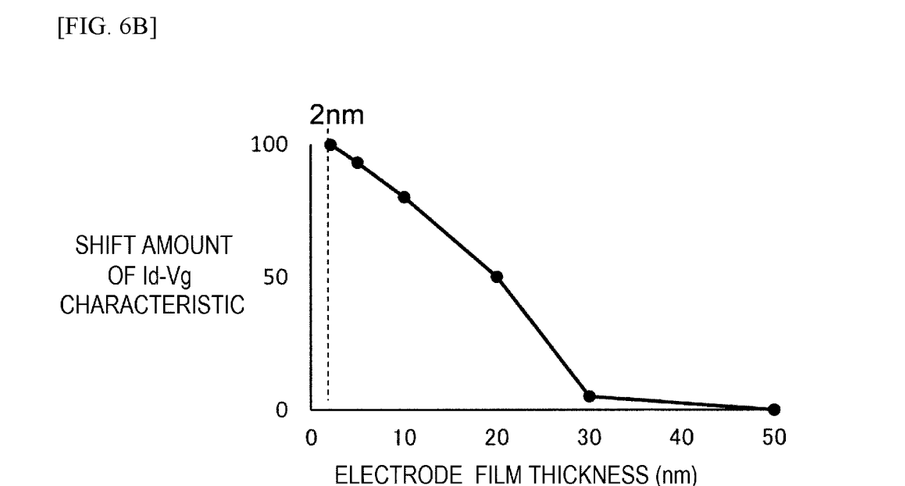
FIG. 6B is a graph showing a relationship between an electrode film thickness and the hydrogen gas permeability.

In this evaluation, a shift amount of the Id-Vg characteristic depending on the presence and absence of the hydrogen atmosphere having a predetermined hydrogen concentration was calculated for each of a plurality of evaluation samples having different gate electrode film thicknesses. The shift amount was obtained as a difference in the source-gate voltage Vg when a predetermined amount of the drain current Id flows. FIG. 6B shows shift amounts of the evaluation samples having different gate electrode film thicknesses, normalized with a shift amount when the gate electrode film thickness is 2 nm as 100. When the Pt film thickness is less than about 2 nm, the Pt thin film is not a continuous film and does not function as a gate electrode, and therefore the characteristics cannot be obtained.

In FIG. 6B, as described above, a horizontal axis represents the film thickness of the Pt film used as the gate electrode, a vertical axis represents the shift amount of the Id-Vg characteristic, and the shift amount is used as an index of a hydrogen permeation amount of the Pt film. When the Pt film is formed by the sputtering method, it is confirmed that if the film thickness is 2 nm or more, grains of Pt are continuous and the Pt film has a smooth surface. It has been confirmed that when the film thickness is large, particularly when the film thickness is 50 nm or more, the grains are large and the surface roughness is 5 nm or more. From this figure, as the Pt film becomes thicker, the hydrogen permeation amount decreases, and when the film thickness is about 30 nm or more, the hydrogen permeation amount becomes fairly small. On the other hand, it can be seen that, as compared with a case in which the film thickness is 2 nm, about 80% of the hydrogen permeation amount is obtained in a case in which the film thickness is 10 nm, and about 50% of the hydrogen permeation amount is obtained in a case in which the film thickness is 20 nm.

As described above, a hydrogen gas hardly passes through the Pt film having a film thickness of more than 30 nm, and the hydrogen gas passes through the Pt film having a film thickness of 30 nm or less. Therefore, according to the experimental result, by setting the first thin film electrode 4A or the second thin film electrode 6A to a Pt film having a thickness of at least 30 nm or less, the hydrogen gas can be transmitted to the electrolyte film 5, and power can be generated. When the film thickness is smaller, in particular, when the film thickness is 10 nm or less, the hydrogen permeation amount becomes larger, the ion conductivity of the electrolyte film is improved, and the power generation efficiency of the fuel cell is improved as well.

On the other hand, as described above, the power loss of the fuel cell can be prevented as the resistance value of the electrode is lower. The resistance of the first mesh-like electrode 4B and the second mesh-like electrode 6B can be reduced as the film thickness is increased. Therefore, it is necessary to consider the resistance values of the first thin film electrode 4A and the second thin film electrode 6A in the second opening portions 9. That is, regarding the first electrode 4, the power loss at the time of power generation is dominated by the power loss due to a voltage drop due to the resistance of the first thin film electrode 4A from a center of the second opening portions 9 to the first mesh-like electrode 4B.

A current path from the center of the second opening portions 9 to the first electrode 4 when the fuel cell generates power flows outward uniformly regardless of angles due to symmetry. Therefore, a voltage drop Vr generated in the first thin film electrode 4A is expressed by (Equation 1).

$$Vr = Is \times r^2 \times R \quad \text{(Equation 1)}$$

Is: current density, r: distance from the center of the second opening portions 9 to the first mesh-like electrode 4B, R: resistance value of the first thin film electrode 4A in the second opening portions 9.

The resistance value R of first thin film electrode 4A in the second opening portions 9 is expressed by (Equation 2).

$$R = \rho \times r^2 / d \quad \text{(Equation 2)}$$

Equation (2) is substituted into Equation (1), and thereby Equation (3) is obtained.

$$Vr = Is \times \rho \times r^4 / d \quad \text{(Equation 3)}$$

ρ: resistivity of an electrode material of the first thin film electrode 4A, d: electrode film thickness of the first thin film electrode.

Figure 7:
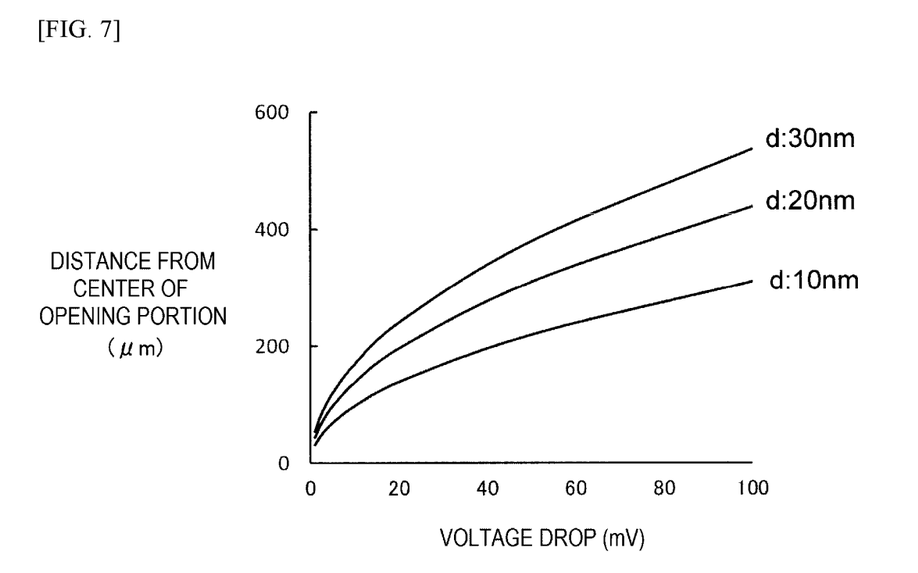
FIG. 7 is a diagram showing a relationship between a voltage drop amount and a distance from the center of an opening portion.

FIG. 7 shows a relationship between the voltage drop Vr and the distance from the center of the second opening portion 9 in a case where a generated voltage is assumed to be 1 V and the current density is assumed to be 400 mA/cm$^2$, for example, which is calculated using the Equation (3). The relationship between the voltage drop Vr and the distance from the center of the opening portions was calculated while the film thickness d of the first thin film electrode 4A in the second opening portions 9 was related to three specifications of 10 nm, 20 nm, and 30 nm.

From FIG. 7, it can be seen that, as the electrode film thickness d increases, the voltage drop amount due to the increase in the distance from the opening portions can be prevented. A reason for this is clear from Equation (2). For example, when the voltage drop is allowed up to 10% of the generated voltage 1 V, since the electrodes (the first electrode 4 and the second electrode 6) are provided on both sides of the electrolyte film 5, in the example of FIG. 7, 50 mV is an allowable voltage drop value, and when the Pt film thickness is 10 nm, a size of the opening portion can be increased up to 200 μm. There is an advantage that, the larger the distance from the center of the opening portions is, the larger a power generation area is, and the higher the power generation efficiency is. However, if the second opening portions 9 are too large, the electrolyte film 5 in the opening portions is broken due to a thermal stress caused by power generation. Empirically, when the distance from the center of the opening portion is increased to more than about 300 μm, the electrolyte film 5 in the opening portion is likely to break by the thermal stress.

As described above, when the thin film electrode of the first electrode or the second electrode is a continuous film having a film thickness of 30 nm or less and the size of the opening portion is within 300 μm from the center of the opening portion, a fuel cell can be implemented in which both improvement of the ion conductivity of the electrolyte film and reduction of the power loss are achieved.

In addition, by forming the second opening portions 9 in the insulating film 3, intervals between the second opening portions 9 can be made smaller than those in the case of forming the second opening portions 9 in the semi-conductor substrate 2. Further, by adjusting the stress of the insulating film 3, it is easy to adjust a film strength in the first opening portion 8.

Although a shape of the second opening portions 9 is rectangular in FIG. 1, the invention is not limited thereto. For example, a hexagonal shape has an advantage that an aperture ratio can be easily increased.

In the example of FIG. 1, although both the first electrode and the second electrode have the same electrode structure, a porous conductive film may be used for the second electrode. As for the first electrode, since a film quality of the electrolyte film 5 can be improved more than that of the first thin film electrode 4A, it is desirable to adopt the structure according to the present embodiment. However, when the second electrode is a porous conductive film, it is desirable to use the second electrode as an air electrode and the first electrode as a fuel electrode so as not to be affected by a corrosive gas. The above modifications also apply to a second embodiment and the like described below.

Second Embodiment

A fuel cell according to a second embodiment has a structure in which electric power is more easily output to the outside than the fuel cell according to the first embodiment by setting heights of a first electrode and a second electrode from a semi-conductor substrate to be the same. In particular, in a case of a stack structure in which surfaces of fuel cells are combined with each other, it is easy to join electrodes to each other and output the joined electrodes.

Figure 8:
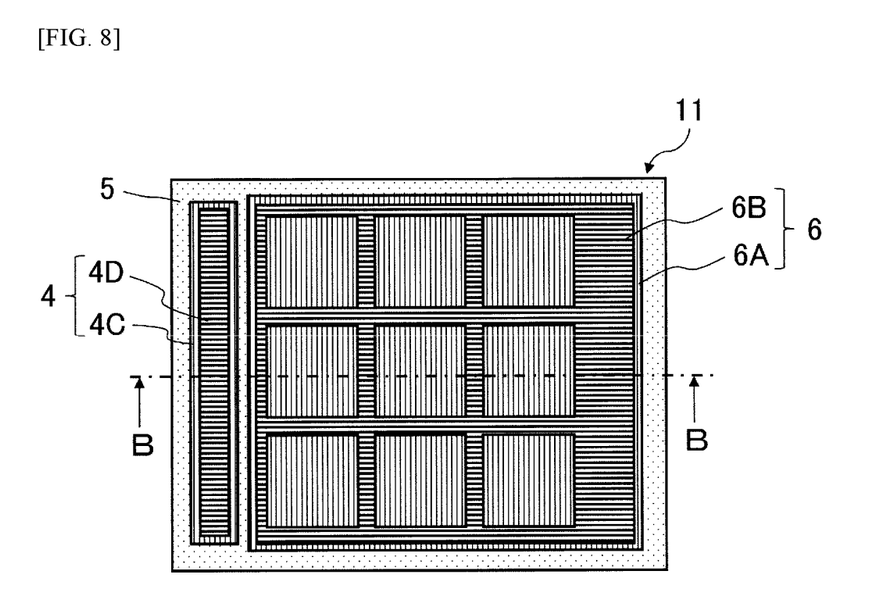
FIG. 8 is a plan view of a fuel cell according to a second embodiment.
Figure 9:
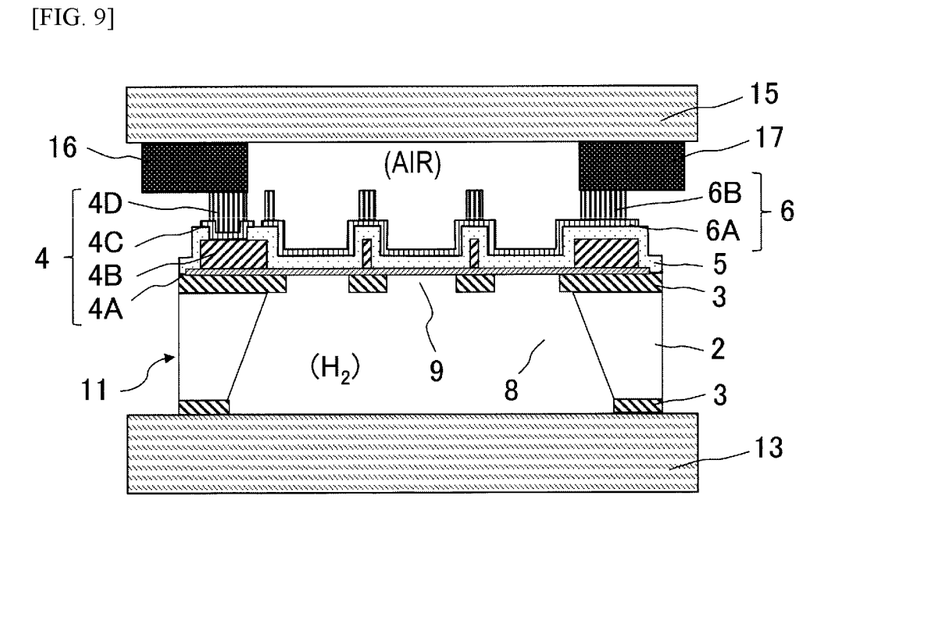
FIG. 9 is a cross-sectional view of the fuel cell and a support member taken along a line B-B in FIG. 8.

FIG. 8 is a plan view of the fuel cell according to the second embodiment. FIG. 9 a cross-sectional view of the fuel cell taken along a line B-B in FIG. 8. FIG. 9 shows a state in which the fuel cell is supported by an upper lid substrate 15 and a pedestal 13, which are support members for the fuel cell and which output electric power generated by the fuel cell to the outside.

As shown in FIG. 8, in a fuel cell 11, the first electrode 4 and the second electrode 6 that output power generated on the electrolyte film 5 are divided into left and right electrodes, and each of the electrodes is connected to, for example, an external terminal disposed separately on left and right. Naturally, the first electrode 4 and the second electrode 6 are separated from each other on the electrolyte film 5.

In FIG. 9, although in the fuel cell 11, the first thin film electrode 4A and the first mesh-like electrode 4B formed on the semi-conductor substrate have the same structure as compared with those in the fuel cell 1 shown in the first embodiment, the electrolyte film 5 formed on the first electrode 4 is provided in a manner of covering the entire semi-conductor substrate. A part of the electrolyte film 5 is removed to expose the first mesh-like electrode 4B, and a third thin film electrode 4C formed on the same layer as the second thin film electrode 6A and a third electrode 4D formed on the same layer as the second mesh-like electrode 6B are formed on the exposed first mesh-like electrode 4B, and the first electrode 4 is formed. As described above, the third thin film electrode 4C and the second thin film electrode 6A, and the third electrode 4D and the second mesh-like electrode 6B are separated from each other, and are not electrically connected to each other. A height from the semi-conductor substrate 2 to an uppermost surface of the third electrode 4D is equal to a height from the semi-conductor substrate 2 to an uppermost surface of the second mesh-like electrode 6B.

When hydrogen gas is supplied to a back surface side of the fuel cell 11 where the first opening portion 8 is provided, in order to form a gas flow path, the lower portion pedestal 13 made of ceramic or metal is provided, and a structure having airtightness is achieved. The upper lid substrate 15 provided with wirings 16 and 17 is placed on an upper side where electrode terminals of the fuel cells 11 exist to form an air flow path. A material of the upper lid substrate 15 is also ceramic or metal. The wiring 16 is connected to the third electrode 4D, and the wiring 17 is connected to the second mesh-like electrode 6B. The wirings 16 and 17 can be connected to a device that consumes power from the fuel cell 11 via a device that controls power generation (not shown) or the like. Naturally, on the upper lid substrate 15, the wiring 16 and the wiring 17 are separated from each other and are not electrically connected to each other.

In the fuel cell 11, since a height of an upper end of the third electrode 4D is equal to a height of an upper end of the second mesh-like electrode 6B, contact with the wiring 16 and the wiring 17 on the upper lid substrate 15 is good and power generation loss can be reduced. Since the fuel cell 11 functions as a partition wall so as not to mix hydrogen gas and air and an output electrode is provided on a side to which air is supplied, there is no risk of corrosion for the electrodes (the first electrode 4 or the second electrode 6) and a risk of ignition of hydrogen gas can be eliminated.

Further, the fuel cell 11 is bonded to the upper lid substrate 15, another upper lid substrate 15 is stacked on the fuel cell 11, and thereby a plurality of fuel cells can be stacked, and a power generation amount can be improved. In this case, a flow path for supplying hydrogen gas is formed on an upper surface (surface facing a surface to which air is supplied) side of the upper lid substrate 15, similarly to the pedestal 13. When the pedestal 13 or the fuel cell is stacked, a sealing material for maintaining airtightness may be interposed between the upper lid substrate 15 and a back surface insulating film 3 of the fuel cell 11.

Third Embodiment

A fuel cell according to a third embodiment has a structure in which a thick film part of the first electrode 4 corresponding to the first mesh-like electrode 4B according to the first embodiment or the second embodiment is provided below a lower surface of the first thin film electrode 4A. As a result, the resistance value of the first electrode 4 can be reduced.

Figure 10:
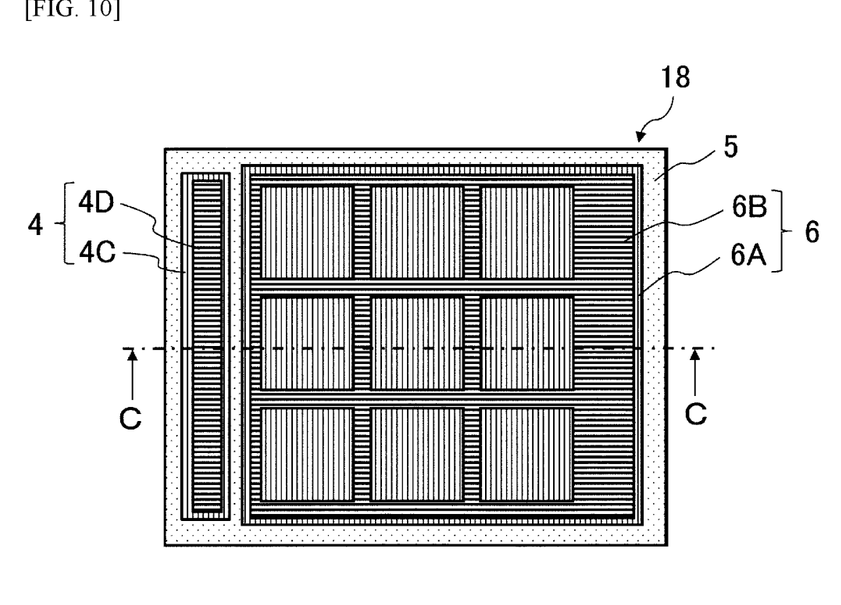
FIG. 10 is a plan view of a fuel cell according to a third embodiment.
Figure 11:
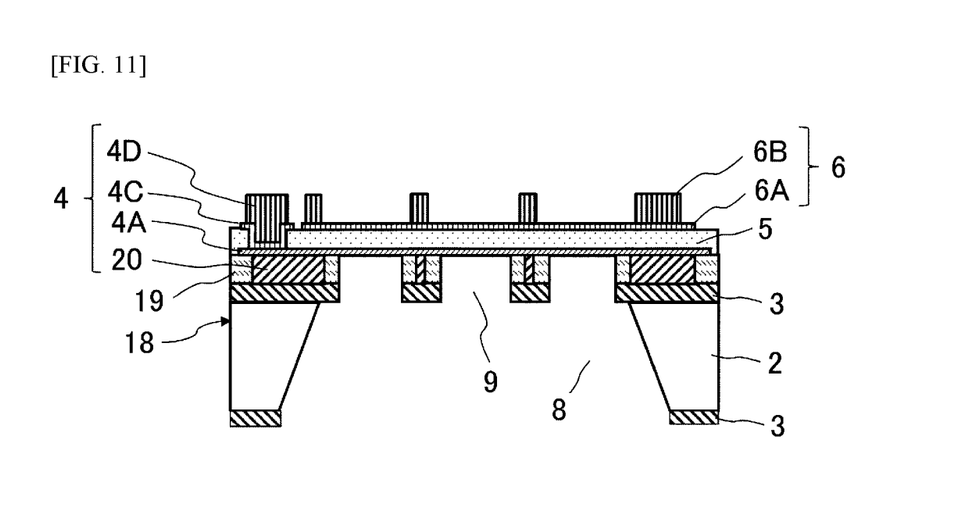
FIG. 11 is a cross-sectional view of the fuel cell taken along a line C-C in FIG. 10.

FIG. 10 is a plan view of the fuel cell according to the third embodiment. FIG. 11 is a cross-sectional view taken along a line C-C in FIG. 10. As shown in FIG. 10, heights of output terminals to the outside of a fuel cell 18 according to the third embodiment are the same. That is, the second electrode 6 includes the second thin film electrode 6A and the second mesh-like electrode 6B formed on the electrolyte film 5, the first electrode 4 includes the third thin film electrode 4C formed in the same layer as the second thin film electrode 6A and the third electrode 4D formed in the same layer as the second mesh-like electrode 6B, and the height of an upper end of the third electrode 4D is equal to the height of an upper end of the second mesh-like electrode 6B.

As shown in FIG. 11, a cross-sectional structure of the fuel cell 18 is the same as the cross-sectional structure of the fuel cell 1 shown in FIG. 2 until the first opening portion 8 is formed in the semi-conductor substrate 2, the insulating film 3 is formed on the semi-conductor substrate 2, and the second opening portions 9 are provided in the insulating film 3. In the first opening portion 8, the insulating film 3 has a mesh-like shape functioning as a support portion, and a mesh-like conductive film 20 is formed corresponding to the support portion. The mesh-like conductive film 20 serves to reduce the resistance of an electrode, similarly to the first mesh-like electrode 4B according to the first embodiment and the like. The conductive film 20 is, for example, a Pt film formed using a sputtering method, or a metal film having a high melting point, a low resistivity, and a thickness of about 200 to 300 nm, such as a W film or a Mo film. A second insulating film 19 is provided on side walls of the conductive film 20 so that the conductive film 20 does not expose from the second opening portions 9. For example, a silicon oxide film can be used as the second insulating film 19. The conductive film 20 and the second insulating film 19 are planarized using a CMP method or the like to have the same film thickness. The first thin-film electrode 4A is formed on the planarized conductive film 20 and the second insulating film 19. After the patterning of the first thin film electrode 4A, the electrolyte film 5 is formed using the sputtering method. In the structure according to the third embodiment, for example, as in the structure according to the first embodiment, since the electrolyte film 5 can be formed without being affected by an unevenness due to the first mesh-like electrode 4B, an interface between the first thin film electrode 4A and the electrolyte film 5 has a flat shape, the crystallinity of the electrolyte film 5 can be increased, leakage due to defects can be reduced even if a film thickness of the electrolyte film 5 is reduced, and therefore the power generation efficiency and a yield can be improved.

Regarding the output of the power generated by the fuel cell 18 to the outside, similar to the second embodiment, an opening portion is provided in the electrolyte film 5, the first thin film electrode 4A is exposed, the third thin film electrode 4C formed in the same layer as the second thin film electrode 6A is connected to the second thin film electrode 6A, and then, the third electrode 4D is formed in the same layer as the second mesh-like electrode 6B. As described above, the first electrode 4 of the fuel cell 18 includes the conductive film 20, the first thin film electrode 4A, the third thin film electrode 4C, and the third electrode 4D.

Also in the fuel cell according to the third embodiment, a resistance value of the first electrode 4 can be reduced by the conductive film 20 patterned in a mesh-like shape, as in the first embodiment and the second embodiment. Furthermore, by making the interface between the electrolyte film 5 and each of the first thin film electrode 4A and the second thin film electrode 6A in a flat shape and making the film thickness smaller, the power generation efficiency and the yield can be improved.

Fourth Embodiment

Figure 12:
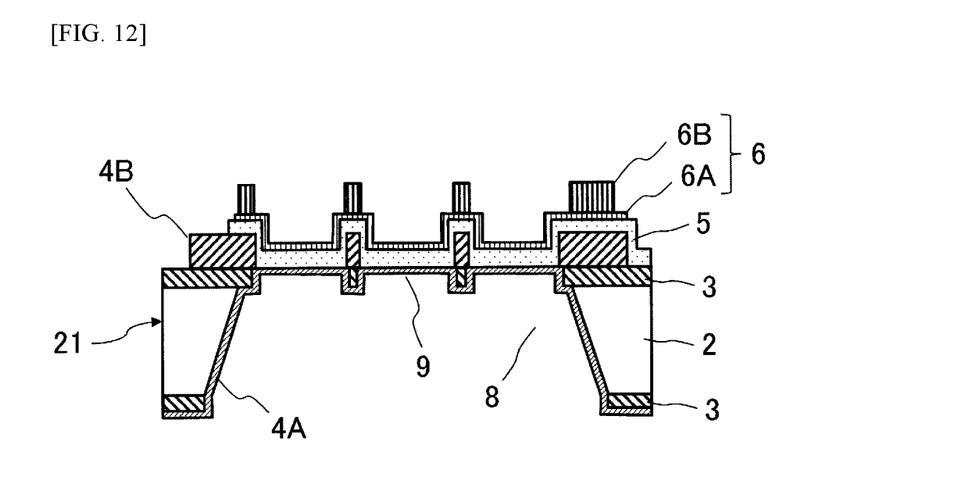
FIG. 12 is a cross-sectional view of a fuel cell according to a fourth embodiment.

In a fuel cell according to a fourth embodiment, the first thin film electrode 4A is disposed on a back side of a substrate. FIG. 12 is a cross-sectional view of a fuel cell 21 according to the fourth embodiment.

As shown in FIG. 12, the first mesh-like electrode 4B is directly formed on the insulating film 3 having the second opening portions 9, and the electrolyte film 5, the second thin film electrode 6A, and the second mesh-like electrode 6B above the first mesh-like electrode 4B are the same as those according to the first embodiment. On the other hand, the first thin film electrode 4A is formed from a back surface side after the first opening portion 8 and the second opening portions 9 are formed. Since a width of the first mesh-like electrode 4B is designed to be larger than a width of the insulating film 3 in the first opening portion 8, the first thin film electrode 4A and the first mesh-like electrode 4B formed from the back surface are connected to each other. As a result, a resistance value of the first electrode 4 can be reduced, and power generation loss of the fuel cell 21 can be reduced. In order to form the electrolyte film 5, similar to the first embodiment, an amorphous film such as a silicon oxide film is formed in the second opening portions 9 (see FIG. 3). A crystallinity of the electrolyte film 5 formed on the amorphous film is further improved. In the fourth embodiment, since the width of the first mesh-like electrode 4B is designed to be larger than the width of the insulating film 3, the electrolyte film 5 is formed substantially on the amorphous film, and thereby the crystallinity is improved, a highly reliable film quality is obtained even if the electrolyte film 5 is thin, and the power generation efficiency can be improved. Also for the fuel cell according to the second embodiment in which the heights of the first electrode 4 and the second electrode 6 are aligned, the configuration can be applied in which the first thin film electrode 4A, which is a characteristic of FIG. 12, is disposed from a back side of the substrate.

REFERENCE SIGN LIST

1, 11, 18, 21: fuel cell
2: semi-conductor substrate
3: insulating film
4: first electrode
4A: first thin film electrode
4B: first mesh-like electrode
5: electrolyte film
6: second electrode
6A: second thin film electrode
6B: second mesh-like electrode
7: electrode opening portion
8: first opening portion
9: second opening portion
10: insulating film
13: pedestal
15: upper lid substrate
16, 17 wiring
19: second insulating film
20: conductive film
60: evaluation sample
61: measurement circuit

The invention claimed is:

1. A fuel cell, comprising:
a support substrate having a region in which a support portion having a mesh shape in a plan view is provided;
a first electrode on the support substrate;
an electrolyte film on the first electrode; and
a second electrode on the electrolyte film, wherein
the first electrode includes a first thin film electrode formed in a manner of covering at least the region, and a first mesh electrode connected to the first thin film electrode and provided corresponding to the support portion, the first mesh electrode having a film thickness larger than that of the first thin film electrode and having a mesh shape in a plan view.

2. The fuel cell according to claim 1, wherein
the second electrode includes a second thin film electrode formed on the electrolyte film in a manner of covering at least the region, and a second mesh electrode connected to the second thin film electrode and provided corresponding to the support portion, the second mesh electrode having a film thickness larger than that of the second thin film electrode and having a mesh shape in a plan view.

3. The fuel cell according to claim 1, wherein
the support substrate includes a semi-conductor substrate, and a first insulating film formed on a first surface of the semi-conductor substrate,
the semi-conductor substrate is provided with a first opening portion extending from a second surface facing the first surface to the first insulating film in the region, and
the support portion is formed in the region by providing a plurality of second opening portions in the first insulating film.

4. The fuel cell according to claim 3, wherein
the first insulating film has a tensile stress.

5. The fuel cell according to claim 3, wherein
the first insulating film is a silicon nitride film, an aluminum nitride film, a stacked film of a silicon nitride film and a silicon oxide film, or a stacked film of a silicon nitride film, a silicon oxide film, and an aluminum nitride film.

6. The fuel cell according to claim 1, wherein
the first thin film electrode is a continuous film formed by a sputtering method.

7. The fuel cell according to claim 6, wherein
a material of the first thin film electrode is any one of Pt, Ag, Ni, Cr, Pd, Ru, and Rh.

8. The fuel cell according to claim 1, wherein
a film thickness of the first thin film electrode is 2 nm or more and 30 nm or less.

9. The fuel cell according to claim 1, wherein
the first mesh electrode is formed of any one of a Pt film, an Au film, an Ag film, an Mo film, a W film, a Ta film, an Hf film, and an Si film, or a stacked film of the films.

10. The fuel cell according to claim 2, wherein
the first thin film electrode, the first mesh electrode, the electrolyte film, the second thin film electrode, and the second mesh electrode are stacked in the above order on the support substrate,
the first electrode includes a third thin film electrode connected to the first mesh electrode and formed in the same layer as the second thin film electrode, and a third electrode connected to the third thin film electrode and formed in the same layer as the second mesh electrode, and
height of an upper end of the third electrode and height of an upper end of the second mesh electrode are equal to each other.

11. The fuel cell according to claim 1, wherein
the first mesh electrode, the first thin film electrode, and the electrolyte film are stacked in the above order on the support substrate, and
an interface between the first thin film electrode and the electrolyte film has a flat shape.

12. The fuel cell according to claim 11, wherein
the second electrode includes a second thin film electrode formed on the electrolyte film in a manner of covering at least the region, and a second mesh electrode connected to the second thin film electrode and provided corresponding to the support portion, the second mesh electrode having a film thickness larger than that of the second thin film electrode and having a mesh shape in a plan view, and
an interface between the second thin film electrode and the electrolyte film has a flat shape.

13. The fuel cell according to claim 12, wherein
the first electrode includes a third thin film electrode connected to the first thin film electrode and formed in the same layer as the second thin film electrode, and a third electrode connected to the third thin film electrode and formed in the same layer as the second mesh electrode, and
height of an upper end of the third electrode and height of an upper end of the second mesh electrode are equal to each other.

14. The fuel cell according to claim 11, wherein
a second insulating film is formed in a manner of covering a side wall of the first mesh electrode.

15. The fuel cell according to claim 1, wherein
the first mesh-like electrode and the electrolyte film are stacked in the above order on the support substrate,
a width of the first mesh electrode is larger than a width of the support portion, and
the first thin film electrode is formed in the region in a manner of being in contact with the support substrate, the electrolyte film, and the first mesh electrode from a side of the support portion facing the stacked side.

\* \* \* \* \*